Patented Dec. 18, 1951

2,579,434

UNITED STATES PATENT OFFICE 2,579,434

PARASITICIDAL COMPOSITION

Eugene E. Kenaga, Midland, Mich., assignor to The Dow Chemical Company, Midland, Mich., a corporation of Delaware No Drawing. Application February 2, 1949, Serial No. 74,247

2 Claims. (Cl. 167—30)

This invention relates to parasiticidal materials and is especially directed to an improved toxicant composition which is non-injurious to plants and plant parts and particularly effective against mite organisms.

Mites are a problem to agriculturists generally. *Paratetranychus pilosus* (European red mite), *Tetranychus bimaculatus* (two-spotted spider mite), *Bryobia sp.* and other related mite organisms are widely distributed throughout the world, and in the United States are known to attack many varieties of trees including apple, sweet and sour cherry, pear, peach, plum, prune, quince, and citrus. In addition, mites cause much damage to several varieties of "small fruit" plants such as raspberry, strawberry and currants; to ornamentals such as spruce; to flowering shrubs such as roses; and to beans and certain other vegetable plants. Few insect pests cause greater damage to so wide a range of plant growth as do the mites and spider mites.

As might be expected, a considerable assortment of parasiticidal materials have been developed and exploited for the control of mite organisms. Because of the variety of plant hosts concerned, the wide range of tolerance of such hosts to the common acaricides, problems of toxic residues, and the like, no currently available material has been found entirely satisfactory. The great reproductive capacity of mite organisms complicates their control. Thus, an acaracidal material adapted to accomplish the quick kill and control of adult mites may be entirely unsatisfactory because of its poor residual activity.

The problem of mite damage to fruit trees has been aggravated in recent years by the increased popularity of the so called DDT type parasiticides. These materials are very effective against many common orchard insects but singularly specific in their failure to control mites. DDT and closely related toxicants appear to kill off the beneficial organisms which normally aid in keeping mite infestation within reasonable bounds. With this upset of biological balance, mites are now a major problem in many areas where they previously were of small importance. The need for improved control methods and compositions is evident.

I have discovered that the combination of 4-nitrophenyl diethyl thiophosphate (commonly identified as Parathion) and 4-chlorophenyl 4-chlorobenzene sulfonate constitutes a preferred parasiticidal composition for the control of mite organisms and that in such composition the compounds are mutually activating to accomplish a synergistic result. The combination, when compounded with a suitable carrier in spray and dust compositions, exerts a prolonged residual action, is more toxic to mite organisms than either constituent alone, and at parasiticidal concentration appears to be lacking in the phytocidal action which characterizes so many known acaricidal materials.

In operating in accordance with the present invention, the new toxicant mixtures are commonly employed along with a carrier in the form of spray and dust compositions. Also, a mixture of toxicants may be so compounded as to produce concentrates adapted subsequently to be used in the preparation of spray or dust mixtures.

In the preparation of sprays, the toxicants may be separately dispersed in the water or other carrier. Alternately, 4-nitrophenyl diethyl thiophosphate and 4-chlorophenyl 4-chlorobenzene sulfonate may be mixed one with the other and the resulting mixture dispersed in water or other liquid carrier. If desired, an organic solvent may be employed as the carrier with the toxicants dissolved therein.

In the preparation of dusts, the toxicant mixture or the toxicants separately may be ground or mixed with the finely divided carrier in any suitable manner. A convenient mode of operation comprises dissolving the toxic mixture in a volatile organic solvent, wetting the finely divided carrier with the solution and thereafter evaporating the solvent out of the mixture. Suitable solvents for use in such operation include acetone, carbon tetrachloride, benzene, toluene, xylene, and the like.

In the preparation of concentrates, mixtures of the toxicants may be ground with suitable wetting and dispersing agents to obtain products adapted to be dispersed in water or other liquid carrier. Alternately, the toxicants may be separately compounded in concentrate form and mixed together upon dilution in the spray tank or otherwise.

The toxicants also may be dissolved in a water-miscible liquid to produce a concentrate adapted subsequently to be incorporated into aqueous spray mixtures. A further type of concentrate consists of a dispersion of the toxicant mixture in a finely-divided solid carrier, with or without emulsifier and dispersing agent. In such mixture a high percentage of the toxicant or toxicants is employed, and the product may be subsequently dispersed in water to produce aqueous spray mixture or further diluted with finely divided carrier to produce dusts.

Any suitable proportion of the 4-nitrophenyl diethyl thiophosphate may be employed in combination with the 4-chlorophenyl 4-chlorobenzene sulfonate. The preferred amounts of materials are dependent upon the type of composition in which the toxicant mixture is to be applied, the nature of the organism to be controlled, the degree of infestation of the plant or tree, and the period for which residual action and control are desired.

In general, from about 0.5 to 10 parts by weight of 4-chlorophenyl 4-chlorobenzene sulfonate is employed for each part of 4-nitrophenyl diethyl thiophosphate. Within this range, the compounds appear to exercise a mutual activation one for the other so that compositions containing the mixture are characterized by an effectiveness against plant parasites which is greater than additive, and further exert a prolonged residual action.

The amount of the toxicant mixture employed in spray mixtures may vary, but in general from about 0.3 to 1.0 pound of actual toxicant mixture per 100 gallons of water or other liquid carrier gives good results. In dust compositions the actual toxicant content should be at least about 0.03 to 5.0 per cent by weight of the ultimate composition. Depending upon whether a concentrate is in the form of a solution, dust dispersion, or simple mixture of the toxicants with wetting and dispersing agents, from about 5 to about 98 per cent by weight of the toxicant mixture may be employed therein.

Any suitable wetting, emulsifying, or dispersing agent may be used with the toxicant mixture provided only that it accomplish the end desired and not be reactive with the other ingredients of the composition. Representative products which have been found satisfactory include sodium lauryl sulfate, di-octyl sodium sulphosuccinate (Aerosol OT) polyethylene glycol-phenol-isooctyl ether (Triton X-100), polyoxyalkylene derivatives of sorbitan trioleate (Tween 85), etc.

In the preparation of liquid concentrates, water-miscible solvents such as alcohol, acetone, dioxane, and the like are conveniently employed. In spray compositions, the toxicant mixture may be dispersed or dissolved in oil-water emulsion composition, alcohol, acetone, chlorinated hydrocarbons, kerosene, conventional spray oils, and the like, instead of water.

Solid carriers which may be employed in the preparation of dust or concentrate products include diatomaceous earth, clays, talc, charcoal, wood flour, pyrophyllite, volcanic ash, and the like.

As regards the persistency of the residues from the toxicant mixtures of the present invention, the new compositions are believed unique. In field determinations, single and thorough applications of the toxicant mixtures have been found to deposit residues which though exposed to all manner of weathering, and possible reinfestation, accomplish effective control of mite populations for as long as 60 to 90 days. Such prolonged residual action is not characteristic of most commercial acaracides.

A further advantage of the new composition consists of the known non-phytocidal nature of residues thereof deposited on plant surfaces. Applications of the new toxicant mixture in conventional formulations and under a wide variety of climatic conditions have failed to produce undesirable plant responses.

The compound 4-chlorophenyl 4-chlorobenzene sulfonate is a white crystalline solid melting at 81°–83° C.

The following examples illustrate the invention but are not to be construed as limiting.

Example 1

16.75 parts by weight of a 93.5 per cent commercial Parathion, 5.05 parts of bentonite, and 78.2 parts of attapulgite clay (Diluex) were mixed and ground together to obtain a dust concentrate comprising 15.6 per cent by weight of Parathion (4-nitrophenyl diethyl thiophosphate). This composition was designated as "Composition A."

In a similar fashion, 40 parts by weight of 4-chlorophenyl 4-chlorobenzene sulfonate was mechanically mixed with 1.5 parts of alkyl aryl sulfonate (Nacconal NR), 2 parts of sodium arylalkyl sulfonic acid product (Daxad No. 27) and 56.5 parts of attapulgite clay (Diluex) to form a concentrate identified as "Composition B."

Compositions A and B both alone and in combination were applied in aqueous dispersion as summer sprays to bearing apple trees of the Northern spy variety. These trees had received a conventional dormant, delayed dormant, etc. spray schedule but had built up a heavy summer population of mixed two-spotted spider mite and European red mite which threatened to interfere with the development of the crop. The applications were made on July 19th following the taking of prespray counts of mites thru the several sections of the orchard. The sprays were applied with conventional mechanical spray rigs and in such quantity as to provide for run-off from the treated leaf, branch, and trunk surfaces. Unsprayed check plots were scattered thru the orchard to provide a continuous source of reinfestation. The following table sets forth the amounts of materials employed and the mite counts obtained in several samplings of the leaves of both the sprayed and check trees:

| Pounds Composition per 100 gallons of spray | | Average number mites per 100 leaves on— | | |
|---|---|---|---|---|
| Composition A | Composition B | Prespray Count July 19 | July 27 | Aug. 7 |
| Ounces 8 | Ounces | 4,000 | 1,080 | 1,460 |
|  | 20 | 540 | 40 | 20 |
| 4 | 10 | 1,110 | 200 | 180 |
| (Check) |  | 350 | 4,980 | 3,890 |

The foliage of the trees sprayed with the combination of toxicants remained green and lush throughout the balance of the growing season. The check trees suffered partial defoliation with yellowing and bronzing of the remaining foliage due to high mite population. No injury to leaves resulted from the spray treatments. An incidental control of many other orchard insects resulted from the application of the mixed toxicants.

Example 2

40 parts by weight of 4-chlorophenyl 4-chlorobenzene sulfonate, 51.5 parts of attapulgite clay (Diluex), 7.5 parts of bentonite, 0.5 part of a partially desulfonated sodium lignosulfate (Marasperse CB), and 0.5 part of polypropylene glycol (molecular weight 1200) were ground and mixed together to produce a concentrate mixture identified as "Composition C."

Mixtures of this composition with the Composition A of Example 1 were applied in aqueous dispersion and with standard spray rigs as summer sprays to several plots of mature Bartlett pear trees. Similarly, Compositions A and B were applied separately to other and immediately adjacent plots, and unsprayed plots were scattered throughout the orchards as checks.

The pear trees were of medium size, completely foliated, and had a light set of fruit. Two-spotted spider mites were not present in the groves in significant numbers at the time of spraying, but past experience indicated the probability of the development of high populations later in the season.

In this operation, the several spray materials were applied at the rate of approximately 12 gallons per tree, and the trees received no other treatment. The following table sets forth the results obtained.

| Pounds Composition per 100 gallons of spray | | Average number of mites per leaf after interval of— | | |
|---|---|---|---|---|
| Composition A | Composition C | 47 days | 61 days | 68 days |
| 1.0 | ------ | 0 | 0.5–1 | 4–10 |
| ------ | 2.0 | 0 | 0 | 1–3 |
| 0.5 | 1.0 | 0 | 0.1–0.5 | 0.1–0.5 |
| (Check) | ------ | 1–3 | 10 | 10–25 |

The control trees had suffered such mite injury at the 68 day interval after spraying as to be 25–50 per cent defoliated. No foliage injury attributable either to the mites or to the toxicant mixture was observed on those trees sprayed with the combination of Compositions A and C in aqueous dispersion.

*Example 3*

Compositions A and B as described in Example 1 were employed in summer spray applications for the control of a mixed infestation of European red mites and two-spotted spider mites on an orchard of bearing plum and prune trees. The materials were applied in aqueous dispersion and with conventional spray rigs in such amount as to accomplish a run off of spray from the leaf and woody surfaces of the trees. Check plots were maintained throughout the orchard.

The applications were made on July 30 at which time the mite populations were very high. The following table sets forth the amounts of materials employed and the average number of live mites per 50 leaves on the dates specified:

| Pounds Composition per 100 gallons of spray | | Average number of mites per 50 leaves on— | |
|---|---|---|---|
| Composition | Composition | Aug. 3 | Aug. 16 |
| Ounces 8 | Ounces ------ | 48 | 211 |
| ------ | 20 | 68 | 10 |
| 4 | 10 | 55 | 8 |
| (Check) | ------ | 849 | 171 |

The foliage of trees in the check plots exhibited severe mite injury during the observation period. Neither spray nor additional mite injury developed in the plots treated with the combination of toxicants.

I claim:
1. A composition for the control of mites and spider mites comprising 4-nitrophenyl diethyl thiophosphate and 4-chlorophenyl 4-chlorobenzene sulfonate in such proportions as to be mutually activating, and wherein from about 1 to 10 parts by weight of 4-chlorophenyl 4-chlorobenzene sulfonate is present for each part by weight 4-nitrophenyl diethyl thiophosphate.
2. An aqueous spray composition for the control of mites and spider mites comprising a dispersion of 4-nitrophenyl diethyl thiophosphate and 4-chlorophenyl 4-chlorobenzene sulfonate in association with a finely divided solid carrier and a wetting and dispersing agent, and wherein from about 1 to 10 parts by weight of 4-chlorophenyl 4-chlorobenzene sulfonate is present for each part by weight of 4-nitrophenyl diethyl thiophosphate.

EUGENE E. KENAGA.

REFERENCES CITED

The following references are of record in the file of this patent:

Martin et al.: B. I. O. S. Final Report No. 1095, Item No. 22, entitled "Developments in Methods and Materials for the Control of Plant Pests and Diseases in Germany," pages 22 and 23, March 24, 1947, 167–Phos.

Lauger et al.: Helv. Chim. Acta., vol. 27, pages 892–908, June 1944, 167–22. (See particularly page 902.)

Metcalf: J. Econ. Ent., vol. 41, No. 6, pp. 875–882, (see particularly page 878). December 1948, 167–DDT.